Jan. 10, 1939.  H. N. BLISS  2,143,537
LIQUID REGISTER
Filed Dec. 24, 1935  2 Sheets-Sheet 1
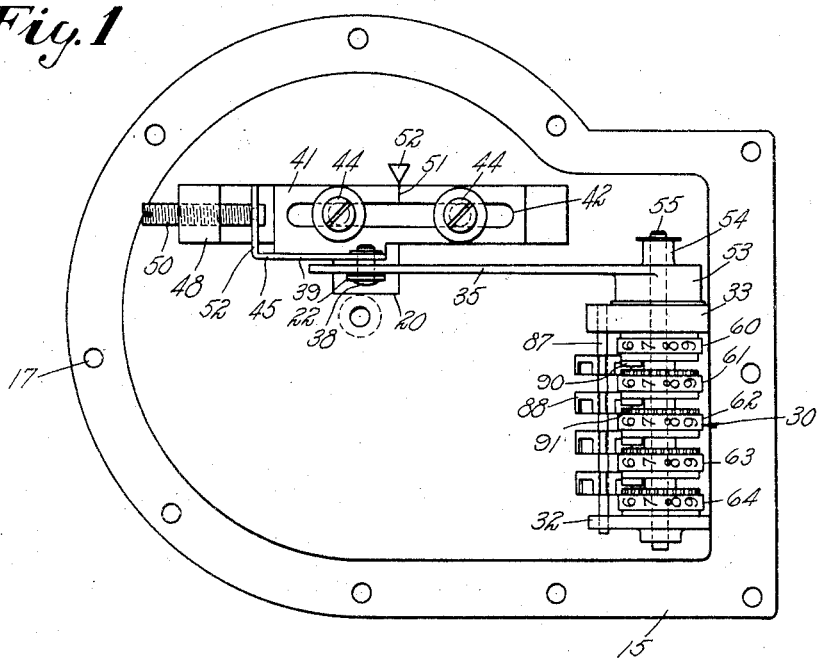
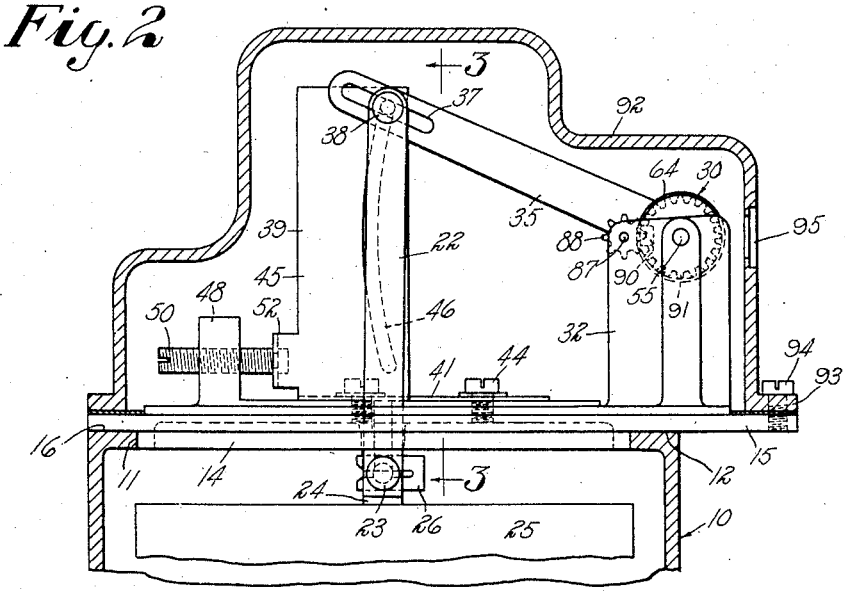
Inventor
Harvey N. Bliss
By *N. Clay Lindsey*
Attorney

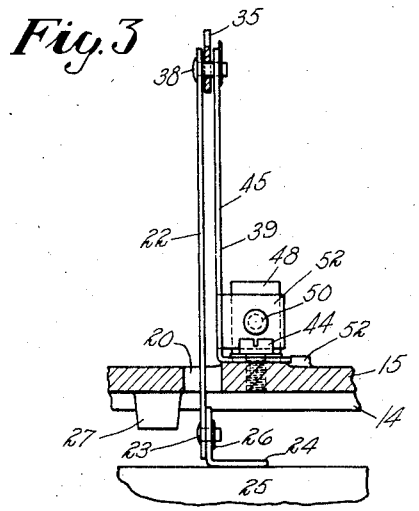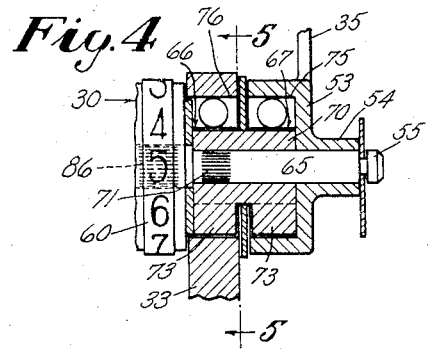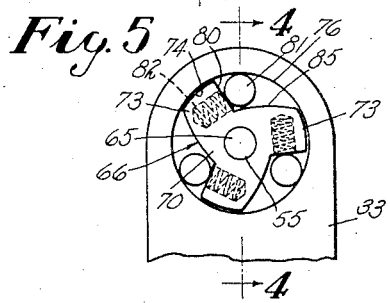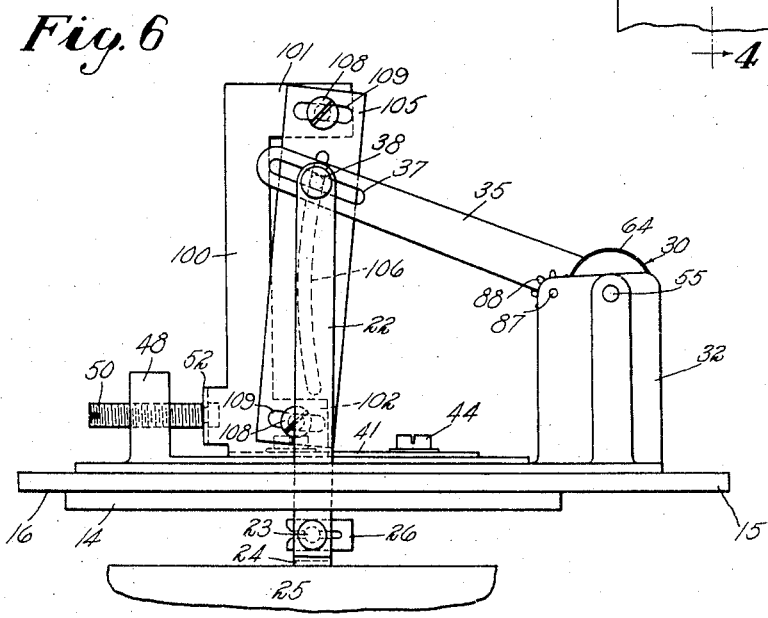

Patented Jan. 10, 1939

2,143,537

UNITED STATES PATENT OFFICE 2,143,537

LIQUID REGISTER

Harvey N. Bliss, East Hartford, Conn., assignor to Veeder-Root, Incorporated, Hartford, Conn., a corporation of Connecticut Application December 24, 1935, Serial No. 56,046

1 Claim. (Cl. 74—104)

This invention relates to a liquid register, and, more particularly, to a device which is arranged to automatically register the accumulative amount of liquid withdrawn from a supply tank.

Heretofore, supply tanks as commonly employed for the storage of liquids have been provided with various types of dispensing apparatus arranged to indicate the amount of withdrawal of liquid from the tank. However, these devices have involved the use of complicated mechanisms which not only proved difficult to maintain in accurate adjustment, but also were expensive to manufacture and required highly skilled labor to install.

It is, therefore, the primary object of this invention to provide a simple and highly efficient mechanism responsive to the change in volume of a liquid within a supply tank and which registers the total amount of liquid withdrawn therefrom.

It is a further object of my invention to provide a compensating device for a counter mechanism wherein a uniform vertical downward movement of a float within a liquid will cause a correspondingly uniform registration of the counter mechanism.

It is a still further object of my invention to provide a device responsive to a downward vertical float movement as caused by the changes in the level of a liquid within a tank whereby successive vertical downward movements of the float will cause successive and correspondingly accumulative movements to register the total amount of liquid withdrawn from the tank.

With these and other objects in view, my invention resides in the unique construction and the combination of members hereinafter fully described, illustrated in the accompanying drawings, and referred to in the claim appended hereto; it being understood, of course, that various changes in the general form, proportion, and size, as well as other minor details of construction lying within the scope of the claim may be resorted to without departing from the spirit of the invention or sacrificing any of the advantages thereof.

In the accompanying drawings wherein like parts are indicated by like reference numerals:

Figure 1 is a plan view of my invention with the protective cover removed;

Fig. 2 is a side elevation of my invention showing the cover and a portion of a supply tank in section to better illustrate the operative mechanism;

Fig. 3 is a side elevation of my compensating device taken substantially along the line 3—3 of Fig. 2;

Fig. 4 is a sectional view taken along the line 4—4 of Fig. 5 and showing the two ball clutches employed in the counter drive mechanism;

Fig. 5 is an end elevation of a ball clutch taken along the line 5—5 of Fig. 4; and Fig. 6 illustrates a modified form of the present invention.

In accordance with my invention, I have provided a simple but accurate registering device wherein a downward linear movement of a float within a liquid, as caused by withdrawal of the liquid from a tank, is arranged to be translated to a correspondingly uniform angular movement and operate a rotary counter mechanism which registers the accumulative amount of liquid withdrawn from the tank.

Referring to the drawings which illustrate my invention, I have provided a liquid consumption indicating device arranged to be secured to the top of a supply tank 10. The supply tank may be of any desired size or shape, but preferably has a uniform cross sectional area so that each unit volume of liquid within the tank will occupy the same vertical distance therein. In the present instance, I preferably show the supply tank as one of cylindrical horizontal cross section and having a substantially cylindrical aperture 11 in its upper end terminating in a flat top face 12. The aperture 11 is adapted to receive a flange 14 depending from a base plate 15 which is provided with a lower peripheral face 16 adapted to mate with surface 12 on the top of tank 10 and be rigidly secured in position by means of suitable securing means such as screws passing through the holes 17. If desired, any type of suitable gasket may be inserted between the mating surfaces 12 and 16 during assembly to prevent leakage therebetween. The tank may be filled through a suitably located aperture. This aperture is not shown since it does not constitute a part of the present invention. It will be appreciated, however, that liquid should not be simultaneously entered into and withdrawn from the tank since the registering device is responsive to the drop in liquid level in the tank.

The base plate 15 is further provided with an aperture 20 which is of such size and shape that a substantially vertical link 22 is free to move therethrough. The lower end of said link is pivotally secured as by a stud 23 to an angle bracket 24 suitably fastened to a float member 25 arranged to float at the top of a body of liquid within tank 10. The stud 23 is provided with an enlarged head at one end and is removably engaged by a locking clip 26 at its other end to prevent the link and bracket from becoming disengaged from their pivotal relation to each other.

Hence, it will be appreciated that for each unit volume of liquid withdrawn from the tank 10, the level of the surface of said liquid will drop a given distance, and the float 25 and link 22 will move downwardly through a corresponding linear distance. The base plate 15 is also provided with a downwardly projecting boss 27 arranged to engage and limit the maximum upward movement of float 25 to prevent any tendency to break or injure link 22 and its associated mechanism. This boss is preferably so located that it only will engage the float when the tank 10 is full.

To accurately register the downward float movement and the amount of liquid withdrawn from the tank, I have provided a rotary type counter generally indicated by numeral 30 and supported by a pair of spaced brackets 32 and 33 which extend upwardly from the base plate 15. The counter is actuated by an angularly movable lever 35 which is secured thereto at one end and is provided at its other end with an elongated slot 37 arranged to slidably and pivotally receive a stud 38 journalled within the upper end of vertical link 22.

In order to translate the downward movement of float 25 and link 22 into a corresponding uniform angular movement of lever 35 and cause an accurate registration upon counter 30, I have provided a compensating member 39. This compensating member preferably comprises an angle bracket having a base portion 41 provided with a longitudinal slot 42 therein which is adapted to receive spaced clamping screws 44 threadably secured within base plate 15. The compensating member 39 is further provided with an upwardly projecting arm 45 having a cam slot 46 therein which is arranged to slidably receive the body portion of stud 38. Stud 38 is constructed similarly to stud 23 with enlarged portions at each end thereof so that the link 22, cam slot 46, and slot 37 will always be pivotally and slidably engaged thereby. The cam slot 46 is constructed with such a curvature that whenever the stud 38 slidably moves through this curvature in response to a vertical float movement, the lever 35 will move in a uniform angular direction while the float moves in a uniform linear direction. In other words, cam slot 46 controls the effective length of lever 35 so that the same partial rotational movement is transmitted to the counter 30 for each unit withdrawal of liquid from the tank 10 irrespective of the position of float 25 within the tank. The present registering mechanism as herein shown is preferably arranged to be employed in conjunction with different sizes of cylindrical tanks having vertical axes, and cam slot 46 may be adjustably positioned to compensate for said different tank diameters so that the withdrawal of fluid therefrom will be accurately registered.

To adjust cam slot 46 to a desired position so that the required movement will be translated into lever 35, the cap screws 44 are positioned intermediate the ends of slot 42 to provide for a horizontal sliding movement of compensating member 39 towards and from counter 30. To facilitate this adjustable movement of cam slot 46, base plate 15 is also provided with an upstanding bracket 48 having an adjusting screw 50 threaded therethrough. One end of the adjusting screw is provided with a suitable tool engaging connection such as a screw driver slot, and the other end is engageable with a laterally protruding portion 52 on arm 45. It will thus be appreciated that by loosening cap screws 44 and rotating adjustment screw 50, the cam slot 46 may be minutely moved to its required location. For convenience of assembly, the base portion 41 of each bracket is provided with an index line 51 which may be aligned with a pointer 52 on base 15. When these parts are aligned, the cam slot 46 is normally located in its required position for a tank of given diameter. However, each bracket may be individually and minutely adjusted to its required position by screw 50 and positively secured therein by screws 44 to compensate for different tank diameters.

Referring more particularly to the counter mechanism and its associated drive, the lower end of lever 35 terminates in a head 53 having a reduced shoulder 54 journalled on a counter shaft 55. The counter shaft which passes through bracket 33 is arranged to axially support a plurality of rotatable counters 60, 61, 62, 63, and 64 and is journalled at its other end within bracket 32. In the present instance, five counter wheels having consecutive spaced numbers from zero to nine on their peripheral faces are provided, but it will be appreciated that any desired number of counter wheels may be employed depending upon the total amount to which the counter mechanism is intended to register.

As illustrated in Figs. 4 and 5, the right-hand end of counter shaft 55 is provided with a reduced portion 65 adapted to receive two oppositely acting one-way clutches 66 and 67 which, in the present instance, are illustrated as ball clutches. These clutches are so arranged that only the downward angular movement of lever 35 will transmit angular rotary movement to counter 30. To accomplish this, I have provided a spider member 70 arranged to slidably fit over the reduced portion 65 and positively engage a fluted portion 71 thereon so that said spider will be secured for integral movement with shaft 55. The spider member is provided with spaced radially extending arms 73 which terminate in cylindrical portions 74. The head 53 is provided with a counterbore 75, and bracket 33 is provided with a bore 76. These bores 75 and 76 are preferably of the same diameter which is slightly greater than that of the curved portions 74.

In view of the fact that the ball clutches 66 and 67 are of duplicate construction and operate in the same manner, it is believed that a description of one of them will suffice to disclose their operative structures. As shown in Fig. 5, I have provided three peripherally spaced radially extending arms arranged to rotate within each of the bores 75 and 76. Each radially extending portion 73 is provided with an outwardly projecting flat face 80 substantially parallel to a radius of shaft 55 and arranged to engage against a ball 81, and a coiled spring 82 received within each arm 73 normally serves to force the balls 81 into positive frictional engagement between the peripheral bores 75 and 76 and a curved portion 85 of the spider which interconnects face 80 and the cylindrical portion 74 of an adjacent spider arm. As shown in Fig. 5, it will be appreciated that whenever the spider is rotated in a clockwise or forward direction, the balls 81 will be forced against and compress coiled springs 82 and be free to roll in engagement with the peripheral face 76 within bracket 33. However, backward rotation of shaft 55 is prevented by clutch 66 since any rotation of the spider in a counter-clockwise direction causes each of the balls to roll forwardly in bore 76, and, aided by springs 82, to become firmly wedged between peripheral surface 76 and a curved portion 85 of the spider, thereby positively locking the spider member relative to bracket 33 and preventing any backward registration of counter 30. The ball clutch 67 is arranged to positively engage counter bore 75 when lever 35 is moved in a downward direction as caused by a downward movement of float 25 resulting from a withdrawal of liquid from supply tank 10. Hence, a downward movement of lever 35, as viewed from the right-hand end of Fig. 4, will serve to positively transmit a clockwise rotary movement of shaft 55 through clutch 67 and fluted portion 71, and clutch 66 will not impede this movement since it is out of engagement when rotated in a clockwise direction, as shown in Fig. 5.

When lever 35 is moved in an upward direction as caused by an upward movement of float 25 when replenishing the supply of liquid within tank 10, the surface 75 is rotated counter-clockwise causing the balls 81 to roll towards surfaces 80 and disengage clutch 67 from lever 35. Hence, no counter wheel movement results therefrom since the counter is intended only to register withdrawal of liquid from the tank. In view of the fact that the counter shaft is easily rotated, I employ the clutch 66 to positively prevent any slight frictional movement between disengaged clutch 67 and lever 35 from transmitting a backward registration to the counter. To accomplish this, the clutch 66 is arranged, as shown in Fig. 5, to engage with bracket 33 and prevent the transmission of any counter-clockwise movement to shaft 55 which might otherwise be caused by an upward movement of lever 35.

The counters are arranged in accordance with usual construction so that each counter wheel of lower order will rotate a complete revolution for one count on each adjacent counter of a higher order. To accomplish this, counter wheel 60 is positively secured on shaft 55 by any suitable means such as a fluted shaft portion 86 engaging therewith so that said counter wheel will rotate integrally with shaft 55. The other counters are each freely journalled on said shaft. In accordance with the usual construction of such counters, there has been provided a back shaft 87 having a plurality of pinions 88 journalled thereon and each of which is engageable between two adjacent counter wheels. As shown in Figs. 1 and 2, the left-hand side of each of the counter wheels 60, 61, 62, and 63 is provided with a laterally projecting portion 90 having two gear teeth thereon, and the right-hand side of each of the counters 61, 62, 63, and 64 is provided with a gear portion 91. The pinions 88 are provided with alternately wide and narrow teeth all of which are engageable with the respective gears 91. The protruding teeth within the portions 90 are arranged to only engage the wide teeth of pinions 88. Hence, in accordance with usual counter construction, it will be appreciated that counter wheel 60 will rotate one complete revolution to register a tenth of a revolution of wheel 61, and wheel 61 will similarly rotate a complete revolution to register a tenth of a rotation of wheel 62, etc.

To protect the various parts of my invention and also prevent tampering therewith, I have provided a suitably shaped casing 92 having a bottom peripheral flanged rim 93 arranged to be secured to plate 15 by cap screws 94. An elongated slot 95 is provided in the front of the casing adjacent to the counter wheels whereby the registration of the total amount of liquid withdrawn may be easily read.

In Fig. 6, I have illustrated a modification of my present invention which embodies the same general operating characteristics of my preferred type of invention as shown in the other illustrations. However, it will be noted that in place of the member 39 I have provided a somewhat similarly shaped member 100 which is cut away to provide two spaced laterally extending arms 101 and 102. A cam guide 105 provided with a cam slot 106 arranged to serve the same purpose as cam slot 46 in my preferred construction is angularly secured by means of two cap screws 108 slidably engaging within slots 109 of guide 105 and threadably received with the laterally extending portions 101 and 102. It will thus be appreciated in this modified construction that the cam slot 106 may not only be laterally positioned relative to counter 30 by means of screw 50, but it may also be angularly positioned by adjustment of screws 108 and the slidable relation of slots 109 thereto.

I claim as my invention:

A compensating device comprising a member arranged for linear movement, a link pivotally connected thereto, a lever journalled at one end for angular movement and having a slot therein at its other end, a pin connecting the link and lever and slidably engaging within said slot, a cam slidably engaging said pin at all times and guiding its path of movement during the link movement, means to adjustably position said cam towards and from the axis of lever movement, and means to angularly adjust the cam relative to said member whereby the linear movement of said member will be positively translated into a corresponding uniform angular movement of said lever.

HARVEY N. BLISS.